(12) United States Patent
Wang et al.

(10) Patent No.: US 10,202,094 B2
(45) Date of Patent: Feb. 12, 2019

(54) AIRBAG DEVICE MOUNTED ON DASHBOARD

(71) Applicant: YANFENG KSS (SHANGHAI) AUTOMOTIVE SAFETY SYSTEMS CO., LTD., Shanghai (CN)

(72) Inventors: Lei Wang, Shanghai (CN); Hong Wang, Shanghai (CN); Ling Ma, Shanghai (CN)

(73) Assignee: Yanfeng KSS (Shanghai) Automotive Safety Systems Co., Ltd., Shanghai (CN)

( * ) Notice: Subject to any disclaimer, the term of this patent is extended or adjusted under 35 U.S.C. 154(b) by 150 days.

(21) Appl. No.: 15/123,001

(22) PCT Filed: Mar. 4, 2015

(86) PCT No.: PCT/CN2015/073640
§ 371 (c)(1),
(2) Date: Sep. 1, 2016

(87) PCT Pub. No.: WO2015/131824
PCT Pub. Date: Sep. 11, 2015

(65) Prior Publication Data
US 2017/0072892 A1    Mar. 16, 2017

(30) Foreign Application Priority Data
Mar. 5, 2014    (CN) .......................... 2014 1 0077757

(51) Int. Cl.
*B60R 21/205*    (2011.01)
*B60R 21/231*    (2011.01)
*B60R 21/2338*   (2011.01)
(Continued)

(52) U.S. Cl.
CPC .......... *B60R 21/205* (2013.01); *B60R 21/206* (2013.01); *B60R 21/231* (2013.01);
(Continued)

(58) Field of Classification Search
CPC . B60R 21/205; B60R 21/2338; B60R 21/231; B60R 21/233; B60R 201/23169; B60R 2021/23386; B60R 21/206
See application file for complete search history.

(56) References Cited

U.S. PATENT DOCUMENTS 5,364,124 A * 11/1994 Donegan ................. B60R 21/16
                                                    280/730.1
5,513,877 A *  5/1996 MacBrien ............. B60R 21/233
                                                    280/732
(Continued)

FOREIGN PATENT DOCUMENTS

CN      102481888 A      5/2012
CN      102858599 A      1/2013
(Continued)

OTHER PUBLICATIONS

International Search Report, dated Jun. 2, 2015, Four (4) Pages.

*Primary Examiner* — Karen Beck
(74) *Attorney, Agent, or Firm* — William H. Honaker; Dickinson Wright PLLC

(57) ABSTRACT

An airbag device mounted on dashboard, comprising an inflatable bag and a gas generator arranged inside a dashboard; wherein upon being filled with gas, the inflatable bag is provided with an upper convex chamber, a lower convex chamber and a concave chamber formed by a pull strap between the upper convex chamber and the lower convex chamber; rear of the upper convex chamber and the lower convex chamber are supported against a dashboard surface; and front of the upper convex chamber and the lower convex chamber form a protective surface. The inflatable bag of the airbag device has a reduced volume, and the gas generator matching the inflatable bag has a reduced output. Moreover, (Continued)

the inflatable bag can maintain the scope and effect of protection to occupant due to its adequate energy absorption ability.

11 Claims, 7 Drawing Sheets

(51) Int. Cl.
 *B60R 21/206* (2011.01)
 *B60R 21/239* (2006.01)
 *B60R 21/233* (2006.01)
(52) U.S. Cl.
 CPC ........ *B60R 21/239* (2013.01); *B60R 21/2338* (2013.01); *B60R 21/233* (2013.01); *B60R 2021/23169* (2013.01); *B60R 2021/23386* (2013.01)

(56) References Cited

U.S. PATENT DOCUMENTS

| | | | | |
|---|---|---|---|---|
| 6,164,696 | A * | 12/2000 | Ellerbrok | B60R 21/2342 280/729 |
| 2003/0006596 | A1 * | 1/2003 | Schneider | B60R 21/233 280/743.1 |
| 2003/0116951 | A1 * | 6/2003 | Igawa | B60R 21/233 280/743.1 |
| 2007/0200320 | A1 * | 8/2007 | Keshavaraj | B60R 21/206 280/730.1 |
| 2010/0225095 | A1 * | 9/2010 | Smith | B60R 21/2338 280/729 |
| 2011/0018240 | A1 * | 1/2011 | Marable | B60R 21/231 280/728.3 |
| 2014/0339798 | A1 * | 11/2014 | Motomochi | B60R 21/231 280/732 |
| 2017/0174171 | A1 * | 6/2017 | Dennis | B60R 21/0136 |
| 2017/0291566 | A1 * | 10/2017 | Karlow | B60R 21/276 |

FOREIGN PATENT DOCUMENTS

| | | | | |
|---|---|---|---|---|
| CN | 103802780 | A | 5/2014 | |
| CN | 203793276 | U | 8/2014 | |
| DE | 102012007110 | A1 * | 8/2013 | ........... B60R 21/205 |
| DE | 102012021987 | A1 * | 5/2014 | ........... B60R 21/231 |
| WO | WO-2017177236 | A1 * | 10/2017 | |

* cited by examiner

AIRBAG DEVICE MOUNTED ON DASHBOARD

CROSS REFERENCE TO RELATED APPLICATIONS

This application claims the benefit of PCT International Application Serial No. PCT/CN2015/073640, filed on Mar. 4, 2015, which claims priority to Chinese Application Serial No. 201410077757.0, filed on Mar. 5, 2014. The entire disclosures of these applications are incorporated by reference.

TECHNICAL FIELD

The present invention relates to a vehicle airbag, in particular to an airbag device mounted on dashboard.

RELATED ART

Typically, airbag devices are mounted to dashboards. When vehicle collisions happen, gas generators supply gas to inflatable bags. Upon inflatable bags break up the door covers on surfaces of dashboards, inflatable bags inflate between dashboards and occupants to protect occupants.

Referring to FIG. 1, the airbag device is usually composed of an inflatable bag 1, a gas generator 2 and support members. The inflatable bag 1 is a direct object for protecting an occupant 3. The inflatable bag 1 receives gas from the gas generator 2. The inflatable bag 1 forms a gas cushion at a high speed, controls pressure of gas and position as well as shape of space occupied by the inflatable bag 1, receives the impact of the occupant 3 at the same time and absorbs collision kinetic energy, thereby to reduce and decrease casualty of the occupant 3. The gas generator 2 used to provide appropriate amount of gas to the inflatable bag 1 in time. The gas generator 2 with a certain reliability and repeatability can supply a given mass of gas into the inflatable bag 1 at a certain flow velocity to protect the occupant 3. Whether the inflatable bag 1 matches the gas generator 2 or not is a key point that influences the protective effect of airbag device.

FIGS. 1 and 2 illustrate a conventional airbag device, wherein a protective surface 4 at the front of the inflatable bag 1 is used to face the occupant 3; a support surface 6 at the top of the inflatable bag 1 is used to face front windshield 5 of the vehicle; a dashboard support portion 8 at the rear of the inflatable bag 1 is supported by dashboard surface 7; and on both sides of the inflatable bag 1 are provided with a vent 9 separately for regulating an internal pressure of the inflatable bag 1. Upon being filled with gas, the inflatable bag 1 is supported on the front windshield 5 and the dashboard surface 7. The inflatable bag 1 is required to completely fill up a space between the front windshield 5 and the dashboard surface 7 such that the inflatable bag 1 forms a protective surface 4 with a necessary protection area. During the vehicle collision, the occupant 3 moves forward because of inertia and impacts the protective surface 4, at the same time, the gas exits from the vent 9 to absorb impact energy so as to protect the occupant 3.

It is appreciated that the volume of the airbag being minimized will reduce not only the usage amount of material for the inflatable bag 1 but also the output of the gas generator 2 which matched the inflatable bag 1 with such smaller volume and thus reduce the production cost. However, the constraint property to the occupant 3 must be ensured in order to protect the occupant 3 from injury, i.e. the protection area of the surface 4 and energy absorption ability of the inflatable bag 1 need to be constant.

Although the cost can be reduced due to the reduced output of the gas generator 2 and the smaller volume of the inflatable bag 1, the energy absorption ability of inflatable bag 1 cannot substantially ensured if the size of the inflatable bag 1 is only reduced in equal proportion and the protection effect to the occupant 3 will decrease.

Therefore, there is a need to provide an airbag device mounted on dashboard that will not only ensure constraint property to the occupant but also reduce the volume of the inflatable bag.

SUMMARY OF THE INVENTION

The object of the present invention is to overcome above problems of the prior art, and provide an airbag device mounted on dashboard with ensured constraint property to the occupant and the reduced volume of the inflatable bag.

In order to achieve above object, the present invention provides an airbag device mounted on dashboard comprising an inflatable bag and a gas generator, wherein the inflatable bag and the gas generator arranged inside a dashboard; upon being filled with gas, the inflatable bag is provided with an upper convex chamber, a lower convex chamber and a concave chamber formed by a pull strap between the upper convex chamber and the lower convex chamber; rear of the upper convex chamber and the lower convex chamber are supported against a dashboard surface; and front of the upper convex chamber and the lower convex chamber form a protective surface.

There is at least one concave chamber that is adjacent to the upper convex chamber or the lower convex chamber with an intermediate convex chamber formed between each adjacent two concave chambers.

Said inflatable bag is formed by sewing side edges of two side pieces with two side edges of a main piece as well as at least one pull strap; each side piece is provided with at least one rectangular cavity positioned on its rear side edge with an intermediate convex chamber formed between each adjacent two rectangular cavities; and at least one of the pull strap is fixed on the main piece in the concave chamber.

The left side edge and the top edge of the said rectangular cavity form a first interior angle with 30°-120°; the right side edge and the top edge of the rectangular cavity forms a second interior angle with 30°-120°; the left side edge of the rectangular cavity and the rear side edge of the side piece form a third interior angle with 60°-120°; the right side edge of the rectangular cavity and the rear side edge of the side piece form a fourth interior angle with 60°-120°

Said pull strap is formed by cutting fabric that constitutes the rectangular cavity of the side piece.

The length of said pull strap is smaller than the length of border of the rectangular cavity that length of the border is a distance between a right side edge rear end and a left side edge rear end of the rectangular cavity.

The length of said pull strap is 70%-90% of the length of said border.

Said inflatable bag is the passenger airbag that is mounted on the upper of the dashboard or knee airbag that is mounted on the lower part of the dashboard.

Said rear is the end supported against the dashboard surface upon the inflatable bag is filled with gas.

The present invention provides an airbag device, which includes an inflatable bag with a reduced volume and a gas generator matching the inflatable bag with a reduced output compared with prior art. Moreover, the inflatable bag can maintain the scope and effect of protection to occupant due to its adequate energy absorption ability, so that not only the constraint property to the occupant is ensured but also the volume of the inflatable bag is reduced and so does the production cost.

DETAILED DESCRIPTION OF PREFERRED EMBODIMENTS

The present invention is described in detail below with reference to drawings.

Embodiment 1

Figure 1:
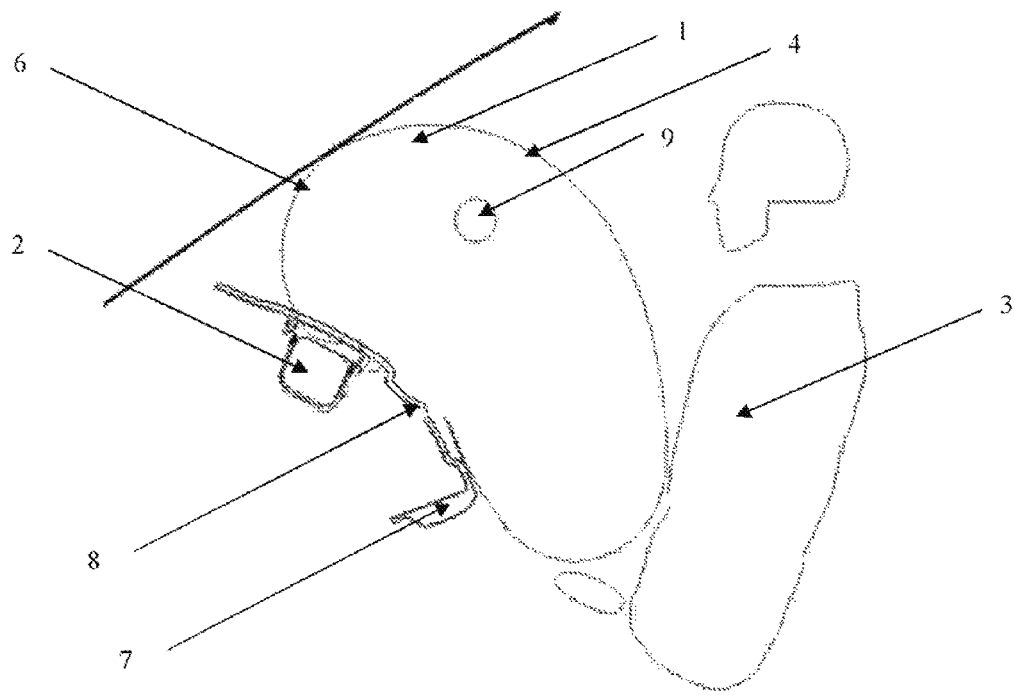
FIG. 1 illustrates a schematic view of an airbag device on passenger side with the inflatable bag filled with gas according to prior art.
Figure 2:
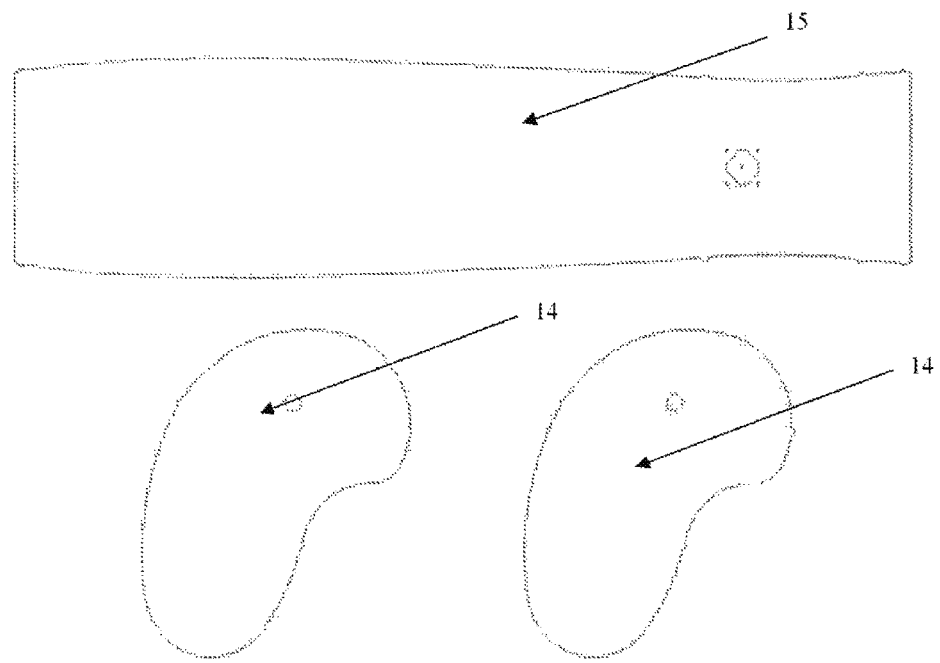
FIG. 2 shows cutting piece of inflatable bag on passenger side according to prior art.
Figure 3:
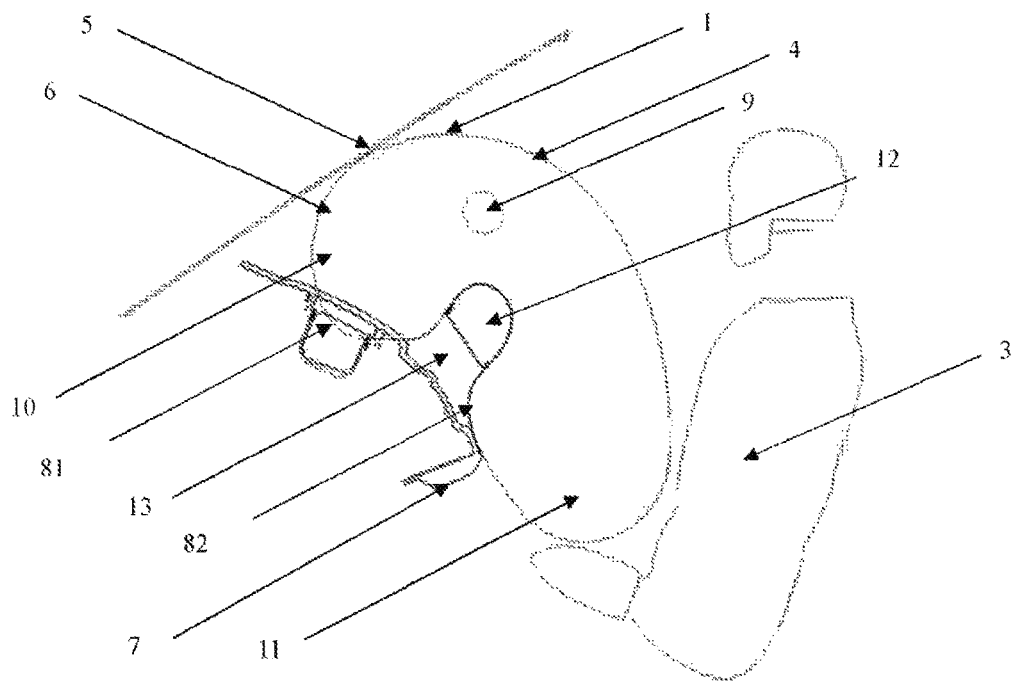
FIG. 3 illustrates a schematic view of the first embodiment with the inflatable bag filled with gas according to the present invention.
Figure 4:
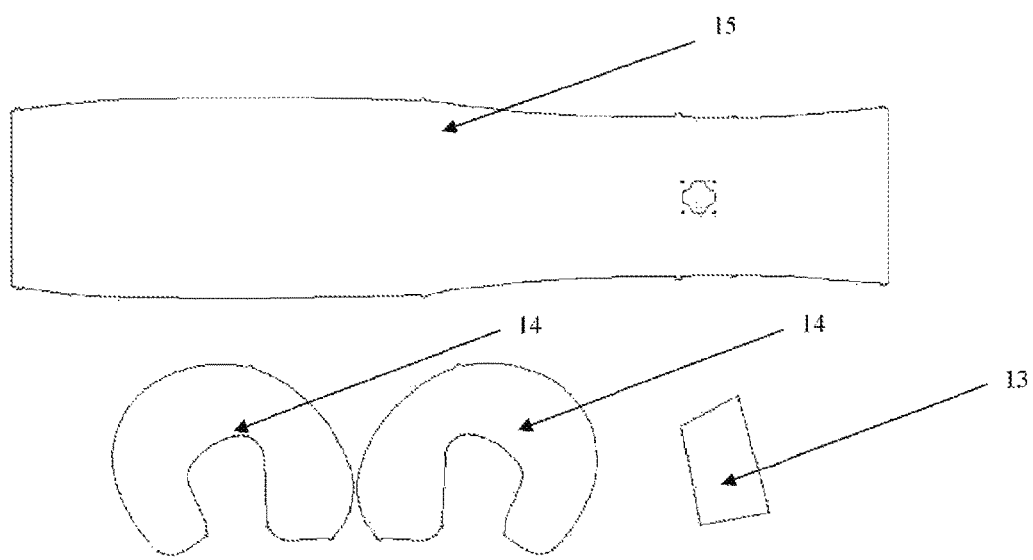
FIG. 4 shows cutting piece of the inflatable bag of the first embodiment according to the present invention.

Referring to FIGS. 3-4, an inflatable bag 1 in this embodiment is a passenger airbag (PAB). The inflatable bag 1 and a gas generator 2 are mounted on the upper part of a dashboard. The inflatable bag 1 is formed by sewing two side pieces 14, a main piece 15 and a pull strap 13. Each of the side pieces 14 is provided with a rectangular cavity 16 on rear side edge. Each of side edges of the two side pieces 14 is sewed firmly to two side edges of the main piece 15. The pull strap 13 is fixed on the main piece 15 in a concave chamber 12 corresponding to the rectangular cavity 16. Upon being filled with gas, the inflatable bag 1 forms an upper convex chamber 10 and a lower convex chamber 11. The concave chamber 12 is formed between the upper convex chamber 10 and the lower convex chamber 11 due to the fixation of pull strap 13.

In the front of the upper convex chamber 10 and the lower convex chamber 11 of the inflatable bag 1 is provided with a protective surface 4 to protect an occupant 3. The rear of the inflatable bag 1 is supported against a dashboard surface 7. Since the inflatable bag 1 includes the upper convex chamber 10 and the lower convex chamber 11, the rear of the inflatable bag 1 is supported against the dashboard surface 7 by a first support portion 81 and a second support portion 82, wherein the first support portion 81 is the rear of the upper convex chamber 10, and the second support portion 82 is the rear of the lower convex chamber 11. The inflatable bag 1 is also provided with at least one vent 9 for regulating an internal pressure.

In order to maintain the position and shape of the upper convex chamber 10, the lower convex chamber 11 and the concave chamber 12 of the passenger airbag, the pull strap 13 is provided between the upper convex chamber 10 and the lower convex chamber 11. Thus the first support portion 81, the second support portion 82 and the protective surface 4 are formed when the inflatable bag 1 is filled with gas.

Figure 5:
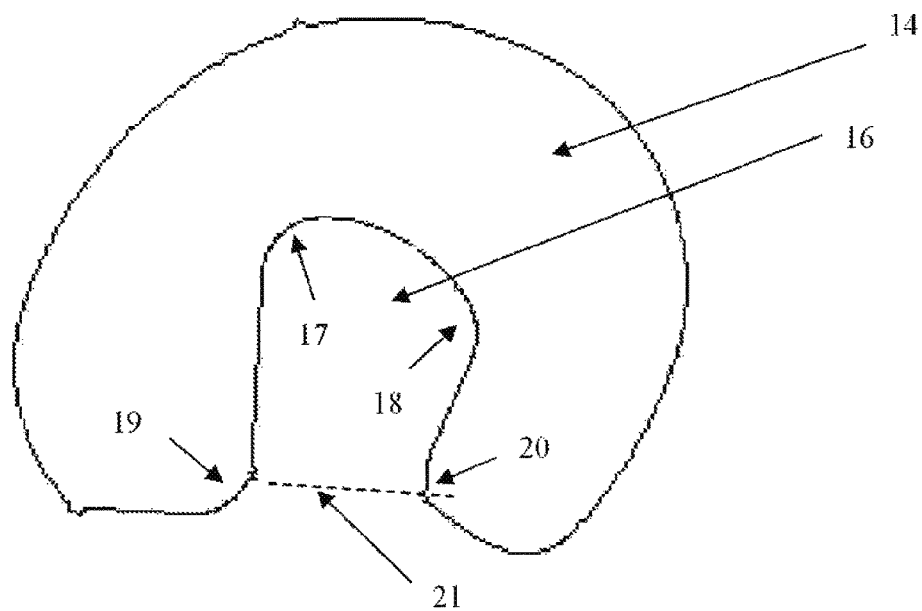
FIG. 5 illustrates a schematic view of the side piece of inflatable bag of the first embodiment according to the present invention.
Figure 6:
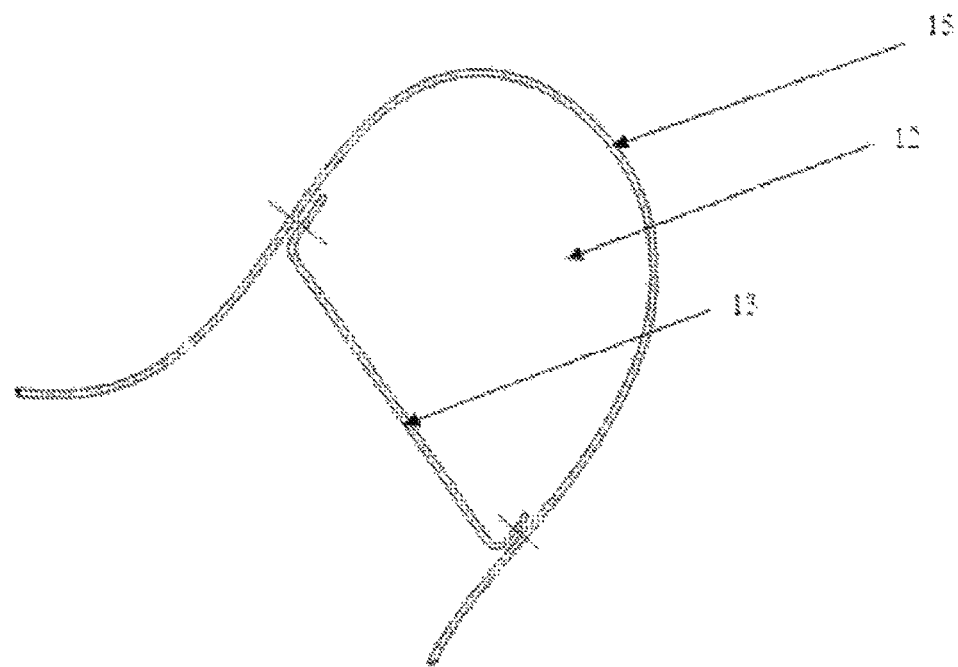
FIG. 6 illustrates a first functional view of the pull strap of the first embodiment according to the present invention.
Figure 7:
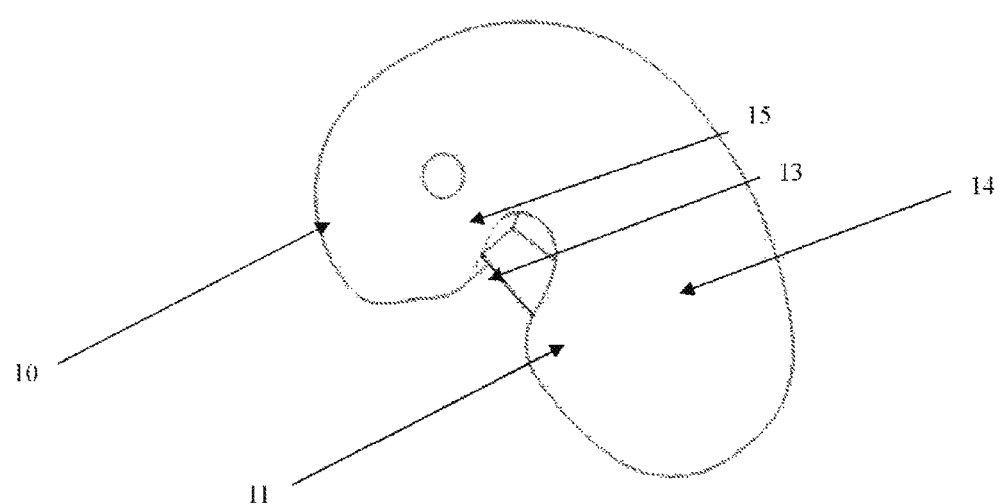
FIG. 7 illustrates a second functional view of the pull strap of the first embodiment according to the present invention.

Further, referring to FIGS. 5-7, the rectangular cavity 16 has four adjustable angles wherein the first interior angle 17 is formed between a left side edge and a top edge of the rectangular cavity 16, the second interior angle 18 is formed between a right side edge and the top edge of the rectangular cavity 16, the third interior angle 19 is formed between the left side edge of the rectangular cavity 16 and the rear side edge of the side piece 14 and the fourth interior angle 20 is formed between the right side edge of the rectangular cavity 16 and the rear side edge of the side piece 14, and a adjustable border 21 which length is a distance between the rear of a right side edge and a left side edge of the rectangular cavity 16. Therefore it can be realized to control the position and shape of the upper convex chamber 10, the lower convex chamber 11 and the concave chamber 12 of the inflatable bag 1 by adjusting the sizes of above four angles and the length of the border 21 during the inflatable bag 1 is filled with gas.

Through analyses of computer-aided engineering (CAE) combined with experiment, a conclusion can be drawn that each of the first and second interior angle 17, 18 of the rectangular cavity 16 is between 30°-120°, preferably 60°-120°; each of the third and fourth interior angle 19, 20 is between 60°-120°, preferably 90°-120°; and the length of the pull strap 13 is 70%-90% of the length of the border 21.

In this embodiment, since the volume of the inflatable bag 1 is decreased, an output of the gas generator 2 that matches to the inflatable bag 1 is reduced accordingly. Compared with the conventional inflatable bag and gas generator with the same occupant protection property, the volume of the inflatable bag 1 can be reduced by 20%-50%, preferably 25%-35%; the output of the gas generator 2 can be reduced by 20%-50%, preferably 25%-35%.

When vehicle collision happens, gases can be supplied to the inflatable bag 1 by the gas generator 2. Upon the inflatable bag 1 being filled full of gas, the support surface 6 is supported against the front windshield 5, and the first support portion 81 and the second support portion 82 are supported on the dashboard surface 7. Although the volume of the inflatable bag 1 is reduced, the area of the protective surface 4 formed by the inflatable bag 1 is constant, such that the scope and effectiveness of protection to the occupant 3 by the protective surface 4 is maintained. During the vehicle collision, the occupant 3 moves forward because of inertia and then impacts the protective surface 4, at the same time, the gas exits from the vent 9 to absorb the impact energy so as to protect the occupant 3.

Figure 11:
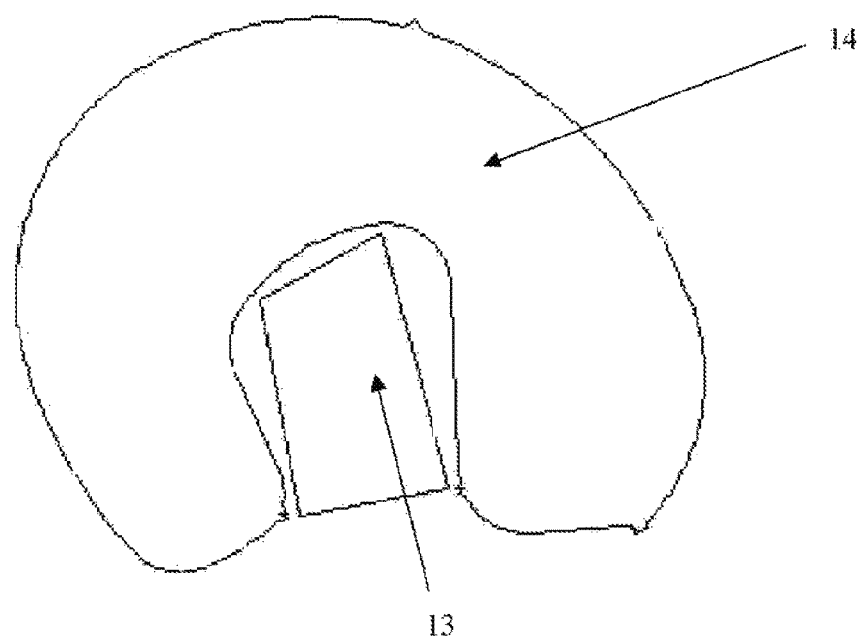
FIG. 11 illustrates a nesting drawing including the side piece and the pull strap of the first embodiment according to the present invention.

Referring to FIG. 11, when a cutting pieces nesting of pull strap 13 and side pieces 14 are performed, the pull strap 13 can be cut from the side piece 14 within the rectangular cavity 16, such that the pull strap 13 is made by cutting extra fabric that constitute the rectangular cavity 16 of the side piece 14. Thus, the utilization of the fabric of the inflatable bag 1 is increased, on the contrary, the amount of the fabric of the inflatable bag 1 is reduced and so does the production cost.

In the specific use, the size of the rectangular cavity 16, i.e. the length of each side edge of the rectangular cavity 16 is determined by the desired size and thickness of the inflatable bag 1 according to the actual vehicle environment.

Embodiment 2

Figure 8:
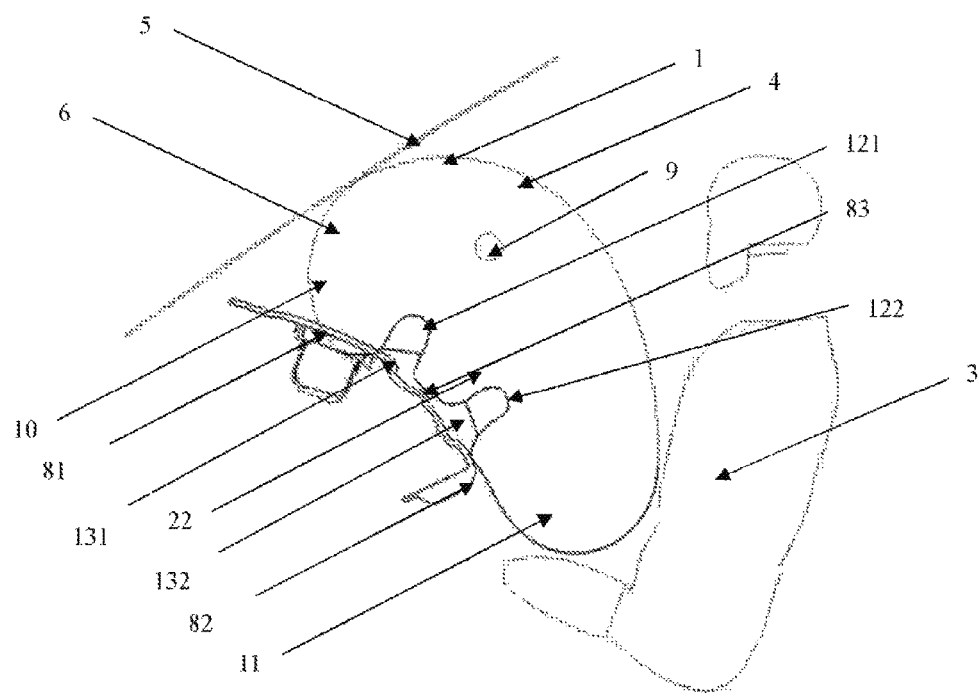
FIG. 8 illustrates a schematic view of the second embodiment with the inflatable bag filled with gas according to the present invention.
Figure 9:
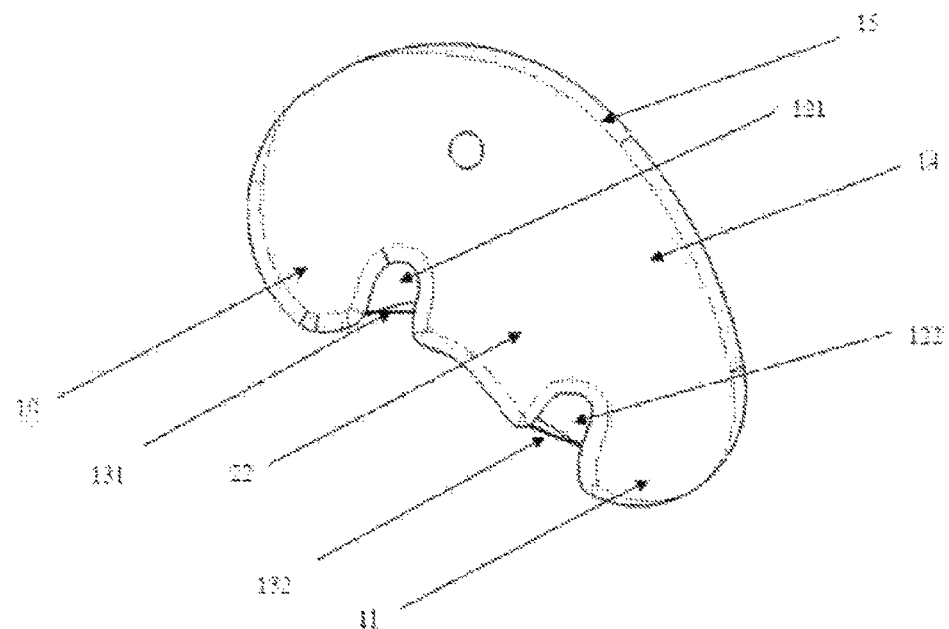
FIG. 9 illustrates a functional view of the pull strap of the second Embodiment according to the present invention.
Figure 10:
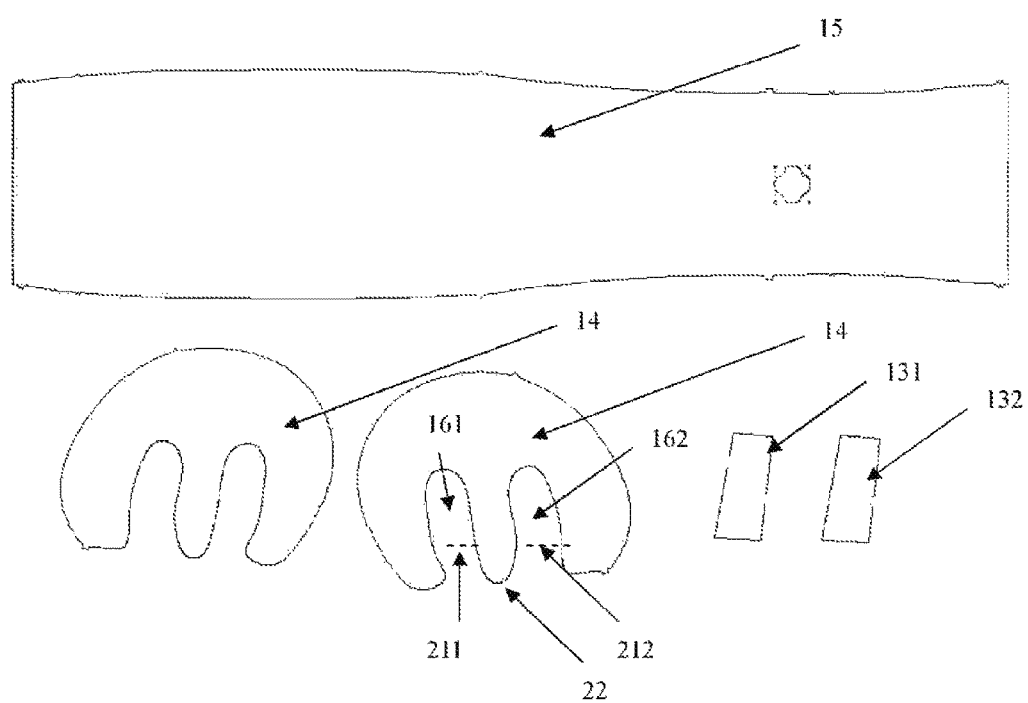
FIG. 10 shows cutting piece of the inflatable bag of the second embodiment according to the present invention.

Referring to FIGS. 8-10, an inflatable bag 1 in this embodiment is a passenger airbag (PAB). The inflatable bag 1 and a gas generator 2 are mounted on the upper part of a dashboard. The inflatable bag 1 is formed by sewing two side pieces 14, a main piece 15 and two pull straps 131, 132. Each of the side pieces 14 is provided with a first rectangular cavity 161 and a second rectangular cavity 162 on the rear side edge, with an intermediate convex chamber 22 disposed between the first rectangular cavity 161 and the second rectangular cavity 162. Each of side edges of the two side pieces 14 is sewed firmly to two side edges of the main piece 15. A first pull strap 131 is fixed on the main piece 15 in a first concave chamber 121 corresponding to the first rectangular cavity 161, while a second pull strap 132 is fixed on the main piece 15 in a second concave chamber 121 corresponding to the second rectangular cavity 162. Upon being filled with gas, the inflatable bag 1 forms an upper convex chamber 10 and a lower convex chamber 11. A first concave chamber 121, a second concave chamber 122 and an intermediate convex chamber 22 located between the concave chambers 121, 122 are formed individually between the upper convex chamber 10 and the lower convex chamber 11.

In the Front of the upper convex chamber 10, the lower convex chamber 11 and the intermediate convex chamber 22 of the inflatable bag 1 is provided with a protective surface 4 to protect an occupant 3. The rear of the inflatable bag 1 is supported against a dashboard surface 7. Since the inflatable bag 1 includes the upper convex chamber 10, the lower convex chamber 11 and the intermediate convex chamber 22, the rear end of the inflatable bag 1 is supported against the dashboard surface 7 by a first support portion 81, a second support portion 82 and a third support portion 83. The first support portion 81 is the rear of the upper convex chamber 10, the second support portion 82 is the rear of the lower convex chamber 11, and the third support portion 83 is the rear of the intermediate convex chamber 22. The inflatable bag 1 is also provided with at least one vent 9 for regulating an internal pressure.

In order to maintain the position and shape of the upper convex chamber 10, the lower convex chamber 11, the intermediate convex chamber 22, the first concave chamber 121 and the second concave chamber 122 of the passenger airbag, the first pull strap 131 is provided between the upper convex chamber 10 and the intermediate convex chamber 22, the second pull strap 132 is provided between the intermediate convex chamber 22 and the lower convex chamber 11. Thus the first support portion 81, the second support portion 82, the third support portion 83 and the protective surface 4 are formed when the inflatable bag 1 is filled with gas.

Further, each of the first rectangular cavity 161 and the second rectangular cavity 162 has four adjustable angles, wherein the first interior angle is formed between a left side edge and a top edge of the first rectangular cavity 161 or the second rectangular cavity 162, the second interior angle is formed between a right side edge and the top edge of the first rectangular cavity 161 or the second rectangular cavity 162, the third interior angle is formed between the left side edge of the first rectangular cavity 161 or the second rectangular cavity 162 and the rear side edge of the side piece 14, and the fourth interior angle is formed between the right side edge of the first rectangular cavity 161 or the second rectangular cavity 162 and the rear side edge of the side piece 14. In addition, the first rectangular cavity 161 has a first adjustable border 211 which length is a distance between right and left side edge of the rear of the first rectangular cavity 161, and a second adjustable border 212 which length is a distance between right and left side edge of the rear of the second rectangular cavity 162. Therefore it can be realized to control the position and shape of the upper convex chamber 10, the lower convex chamber 11, the intermediate convex chamber 22, the first concave chamber 121 and the second concave chamber 122 by adjusting the sizes of above four angles and the lengths of the first border 211 and the second border 212 during the inflatable bag 1 is filled with gas.

Through analyses of the CAE combined with experiment, a conclusion can be drawn that each of the first and second interior angle of the first and second rectangular cavity 161, 162 is between 30°-120°, preferably 60°-120°; each of the third and fourth interior angle is between 60°-120°, preferably 90°-120°; the length of the first pull strap 131 is 70%-90% of the length of the first border 211; and the length of the second pull strap 132 is 70%-90% of the length of the second border 212.

In this embodiment, since the volume of the inflatable bag 1 is decreased reduced, an output of the gas generator 2 that matches to the inflatable bag 1 is reduced accordingly. Compared with the conventional inflatable bag and gas generator with the same occupant protection property, the volume of the inflatable bag 1 can be reduced by 20%-50%, preferably 25%-35%; the output of the gas generator 2 can be reduced by 20%-50%, preferably 25%-35%.)

When vehicle collision happens, gases can be supplied to the inflatable bag 1 by the gas generator 2. Upon the inflatable bag 1 being filled full of gas, the support surface 6 is supported against the front windshield 5, and the first support portion 81, the second support portion 82 and the third support portion 83 are supported on the dashboard surface 7. Although the volume of the inflatable bag 1 is reduced, the area of the protective surface 4 formed by the inflatable bag 1 is constant, such that the scope and effectiveness of protection to the occupant 3 by the protective surface 4 is maintained. During the vehicle collision, the occupant 3 moves forward because of inertia and then impacts the protective surface 4, at the same time, the gas exits from the vent 9 to absorb the impact energy so as to protect the occupant 3.

Figure 12:
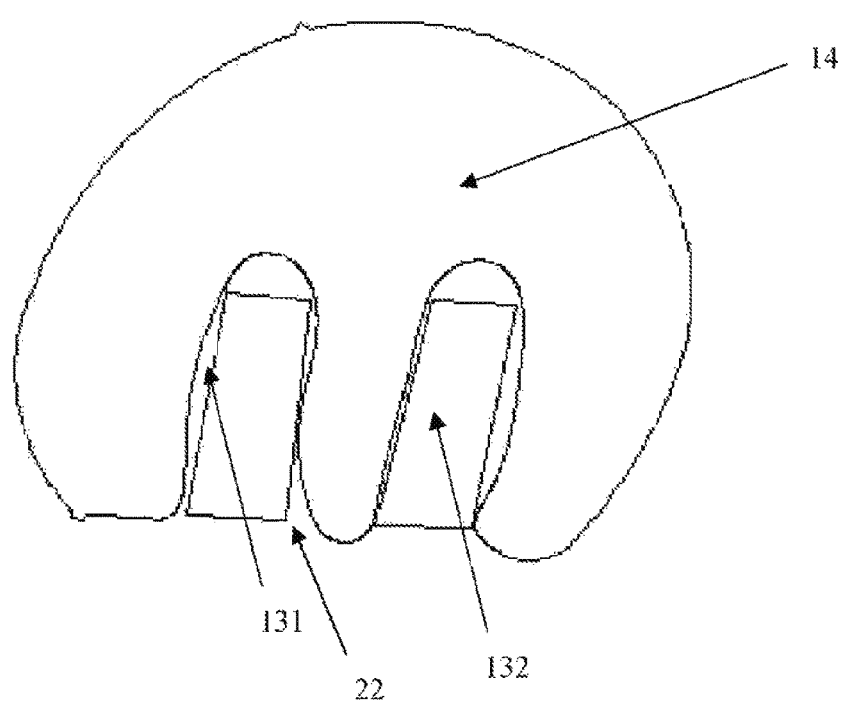
FIG. 12 illustrates a nesting drawing including the side piece and the pull strap of the second embodiment according to the present invention.

Referring to FIG. 12, when the cutting pieces nesting of first pull strap 131, the second pull strap 132 and side pieces 14 are performed, the first pull strap 131 and the second pull strap 132 can be respectively cut from the side piece 14 within the first and second rectangular cavities 161, 162, such that each of the first pull strap 131 and the second pull strap 132 is made by cutting extra fabric that constitute the first rectangular cavity 161 and the second rectangular cavity 162 of the side piece 14. Thus, the utilization of the fabric of the inflatable bag 1 is increased, on the contrary, the amount of the fabric of the inflatable bag 1 is reduced and so does the production cost.

In this embodiment, the size of the first rectangular cavity 161 is identical to the second rectangular cavity 162, and the length of the first pull strap 131 is identical to the second pull strap 132. However, in the specific use, the sizes of the multiple rectangular cavities, i.e. the lengths of side edges of the rectangular cavities are determined by the desired size and thickness of the inflatable bag according to the actual vehicle environment. Namely, the sizes of the multiple rectangular cavities can be the same or different according to the actual vehicle environment and desired protection property. Also, the lengths of pull straps corresponding to the rectangular cavities can be different.

Embodiment 3

Figure 13:
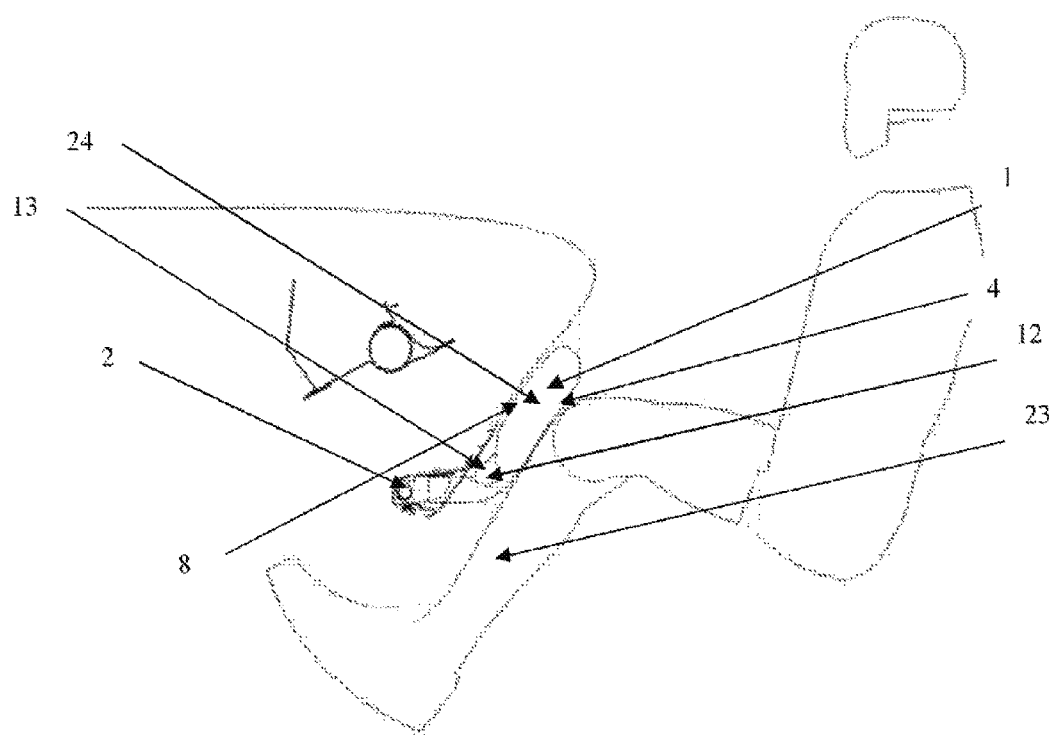
FIG. 13 illustrates a schematic view of the third embodiment with the inflatable bag filled with gas according to the present invention.

Referring to FIG. 13, an inflatable bag 1 in this embodiment is a knee airbag (KAB). The inflatable bag 1 and a gas generator 2 are mounted on the lower part of a dashboard. Upon being filled with gas, the inflatable bag 1 forms a first convex chamber 24 and a second convex chamber 11. A concave chamber 12 is formed between the first convex chamber 24 and the second convex chamber 11 due to the fixation of pull strap 13.

In the front of the first convex chamber 24 of the inflatable bag 1 is provided with a protective surface 4 to protect legs 23 of an occupant. The first convex chamber 24 of the inflatable bag 1 faces to knees and upper portion of calves of the occupant 3, and concave chamber 12 of the inflatable bag 1 corresponds to middle-upper portions of calves of the occupant 3. Similarly, the rear of the inflatable bag 1 is supported against a dashboard surface 7. Since the inflatable bag 1 includes the first convex chamber 24, the rear of the inflatable bag 1 is supported against the dashboard surface 7 by a support portion 8, wherein the support portion 8 is the rear of the first convex chamber 24.

In order to maintain the position and shape of the first convex chamber 24, the concave chamber 12 and the second convex chamber 11 of the passenger airbag 1, the pull strap 13 is fixed between the first convex chamber 24 and the second convex chamber 11. Thus upon being filled with gas, the inflatable bag 1 forms the support portion 8 and the protective surface 4.

In this embodiment, since the volume of the inflatable bag 1 is decreased, an output of the gas generator 2 that matches the inflatable bag 1 can be reduced accordingly.

When vehicle collision happens, gases can be supplied to the inflatable bag 1 by the gas generator 2. Upon the inflatable bag 1 being filled full with gas, the support portion 8 is supported against the dashboard surface 7. Although the volume of the inflatable bag 1 is reduced, the area of the protective surface 4 formed by the inflatable bag 1 is constant, such that the scope and effectiveness of protection to the legs 23 by the protective surface 4 is maintained. During the vehicle collision, legs 23 of the occupant move forward because of inertia and then impact the protective surface 4 in order to absorb the impact energy so as to protect the occupant 3.

In this embodiment, there is only one concave chamber 12. However, the number and size of the concave chamber 12 can be determined by the desired size and thickness of the inflatable bag according to the actual vehicle environment.

In conclusion, the airbag device of the present invention can be mounted on the upper part of the dashboard so as to be the passenger airbag and also can be mounted on the lower part of the dashboard so as to be the knee airbag.

What is claimed is:

1. An airbag device mounted on dashboard, comprising:
   an inflatable bag and a gas generator arranged inside a dashboard; wherein
   upon being filled with gas, the inflatable bag is provided with an upper convex chamber, a lower convex chamber and at least one concave chamber formed by a pull strap between the upper convex chamber and the lower convex chamber;
   the rear of the upper convex chamber and the lower convex chamber are supported against a dashboard surface; and
   the front of the upper convex chamber and the lower convex chamber form a protective surface;
   wherein the protective surface has a convex shape across its entirety;
   wherein the at least one concave chamber includes a first concave chamber adjacent to the upper convex chamber and a second concave chamber adjacent to the lower convex chamber, and wherein an intermediate convex chamber is formed between the first and second concave chambers.

2. An airbag device mounted on dashboard, comprising:
   an inflatable bag and a gas generator arranged inside a dashboard; wherein
   upon being filled with gas, the inflatable bag is provided with an upper convex chamber, a lower convex chamber and at least one concave chamber formed by a pull strap between the upper convex chamber and the lower convex chamber;
   the rear of the upper convex chamber and the lower convex chamber are supported against a dashboard surface; and
   the front of the upper convex chamber and the lower convex chamber form a protective surface;
   wherein the protective surface has a convex shape across its entirety;
   said inflatable bag is formed by sewing side edges of two side pieces with two side edges of a main piece as well as at least one pull strap;
   each side piece is provided with at least one rectangular cavity positioned on its rear side edge with an intermediate convex chamber formed between each adjacent two rectangular cavities; and
   the at least one pull strap is fixed on the main piece in the at least one concave chamber.

3. The airbag device mounted on dashboard according to claim 2, wherein said pull strap is formed by cutting fabric that constitutes the rectangular cavity of at least one of the side pieces.

4. The airbag device mounted on dashboard according to claim 2, wherein the length of said pull strap is smaller than the length of a border of the rectangular cavity of at least one of the side pieces, wherein the length of the border is a distance between a right side edge rear end and a left side edge rear end of the rectangular cavity.

5. The airbag device mounted on dashboard according to claim 4, wherein the length of said pull strap is 70%-90% of the length of said border.

6. The airbag device mounted on dashboard according to claim 1, wherein said inflatable bag is a passenger airbag that is mounted on the upper part of the dashboard or a knee airbag that is mounted on the lower part of the dashboard.

7. The airbag device mounted on dashboard according to claim 1, wherein the rear of the upper convex chamber and the rear of the lower convex chamber are supported against the dashboard surface upon the inflatable bag being filled with gas.

8. The airbag device mounted on dashboard according to claim 2, wherein said rear is the end supported against the dashboard surface upon the inflatable bag being filled with gas.

9. The airbag device mounted on dashboard according to claim 4, wherein said rear is the end supported against the dashboard surface upon the inflatable bag being filled with gas.

10. The airbag device mounted on dashboard according to claim 1, wherein the protective surface does not concave towards the dashboard surface upon being inflated.

11. An airbag device mounted on dashboard, comprising:
an inflatable bag and a gas generator arranged inside a dashboard; wherein
upon being filled with gas, a rear surface of the inflatable bag is provided with an upper convex chamber, a lower convex chamber, and a first concave chamber formed by a first pull strap between the upper convex chamber and the lower convex chamber and adjacent to the upper convex chamber, and a second concave chamber formed by a second pull strap between the upper convex chamber and the lower convex chamber and adjacent to the lower convex chamber, and an intermediate convex chamber formed between the first and second concave chambers;
the rear surface of the upper and lower convex chambers is supported against a dashboard surface; and
a front surface of the upper and lower convex chambers opposite the rear surface forms a protective surface.

* * * * *